June 7, 1949.     F. G. KOEHLER     2,472,331
TRACTION ATTACHMENT FOR MOTOR VEHICLES
Filed Dec. 18, 1945
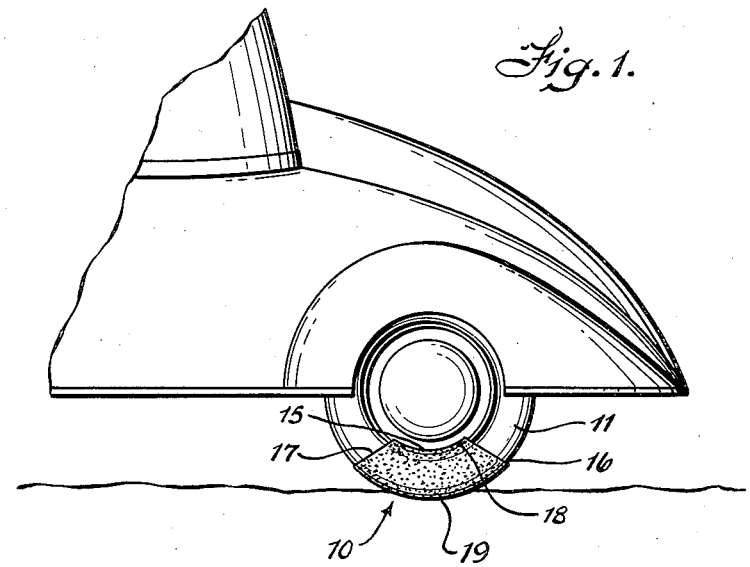
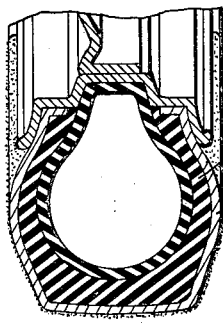
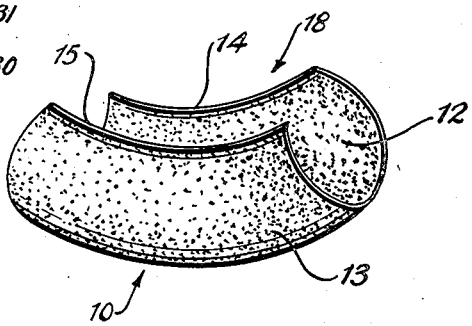
Inventor
Fred G. Koehler.
By Clarence A. O'Brien
and Harvey B. Jacobson
Attorneys Patented June 7, 1949

2,472,331

UNITED STATES PATENT OFFICE 2,472,331

TRACTION ATTACHMENT FOR MOTOR VEHICLES

Fred G. Koehler, Chicago, Ill.

Application December 18, 1945, Serial No. 635,620

1 Claim. (Cl. 152—211)

The accompanying drawings illustrate and the specification which follows fully describes and explains the application of one embodiment of this invention, an object of which is to provide means whereby an automobile or other motor vehicle may be easily and quickly extricated from icy or muddy ruts and the like.

Another object of the invention is to provide a segmental outside shoe for a motor vehicle tire.

A further object of this invention is to provide an outside shoe for tires having abrasive inner and outer surfaces.

Another object of the invention is to provide what I term a winter tire in which is formed a segment of a traction member of a character to securely grip into ice, mud or other slippery surfaces.

Other features and advantages will become more readily apparent from the following description and the accompanying illustrative drawings in which:

Figure 1 is a diagrammatic view illustrating the application of the invention;

Figure 2 is a perspective view of a segmental shoe;

Figure 3 is a longitudinal sectional view of the tire embodying a modified form of the device; and Figure 4 is a transverse section of a tire embodying the modified form of the device.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 refers to the invention and 11 indicates an automobile tire to which it is attached.

The shoe 10 is of segmental form, both its inner surface 12 and its outer surface 13 are impregnated with an abrasive, the inner abrasive being of a nature of a semi-adhesive or coated with a semi-adhesive. The outer abrasive being of a decidedly gritty nature so as to adhere to ice or slippery roads. The edges 14 and 15 of the shoe are provided with heavy flanges adapted to be caught between the wheel rim and the flanges of the tire 11. The ends 16 and 17 of the shoe are beveled, making the inner portion 18 shorter than the tread portion 19.

While the above described form of the invention is adapted to be attached temporarily to the tire 11, and which may be peeled therefrom when not further required, still one form of the invention adapted for extremely cold climates comprises a shoe 30 which may be embedded in the tire 31 for permanent attachment thereto in the manufacture of the tire. This form of the invention may be used in milder climates during the winter periods after which they may be removed and have the usual form of tire substituted therefor.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

The described device consisting of a shoe segment and means for fixing the same to a tire, said segment having an abrasive inner surface and an outer traction surface, said means adapted to be secured under the rim of a wheel and held between the rim and the tire, said device being embedded in the body of the tire and having its outer surface exposed and substantially flush with the tread of the tire.

FRED G. KOEHLER.

REFERENCES CITED

The following references are of record in the file of this patent:

UNITED STATES PATENTS

| Number | Name | Date |
| --- | --- | --- |
| 1,025,734 | Bosquett | May 7, 1912 |
| 1,108,389 | O'Neil | Aug. 25, 1914 |
| 1,332,362 | Schwartz | Mar. 2, 1920 |
| 1,644,104 | Blaylock | Oct. 4, 1927 |

FOREIGN PATENTS

| Number | Country | Date |
| --- | --- | --- |
| 11,617 | Great Britain | 1885 |
| 12,495 | Great Britain | May 20, 1897 |
| 339,452 | France | Apr. 18, 1904 |
| 29,802 | Great Britain (1909) | Dec. 21, 1909 |